(No Model.)

S. C. HICKERSON.
NUT LOCK.

No. 476,382. Patented June 7, 1892.

Witnesses
B. S. Ober
W. S. Duvall

Inventor
S. C. Hickerson.

By his Attorneys,
C. A. Snow & Co.

UNITED STATES PATENT OFFICE.

SAMUEL C. HICKERSON, OF MALTA, OHIO, ASSIGNOR OF ONE-HALF TO ELMER L. JAMES, OF SAME PLACE.

NUT-LOCK.

SPECIFICATION forming part of Letters Patent No. 476,382, dated June 7, 1892.

Application filed January 2, 1892. Serial No. 416,830. (No model.)

*To all whom it may concern:*

Be it known that I, SAMUEL C. HICKERSON, a citizen of the United States, residing at Malta, in the county of Morgan and State of Ohio, have invented a new and useful Improvement in Nut-Locks, of which the following is a specification.

This invention relates to improvements in nut-locks, and to that particular class thereof in which the locking device and function resides in the nut.

The objects of my invention are therefore to provide a nut so constructed as to automatically lock against retrograde movement at any point along a bolt, and also capable of removal when desired without injury or impairment thereof.

Other objects and advantages of the invention will appear in the following description, and the novel features thereof will be particularly pointed out in the claims.

Figure 1:
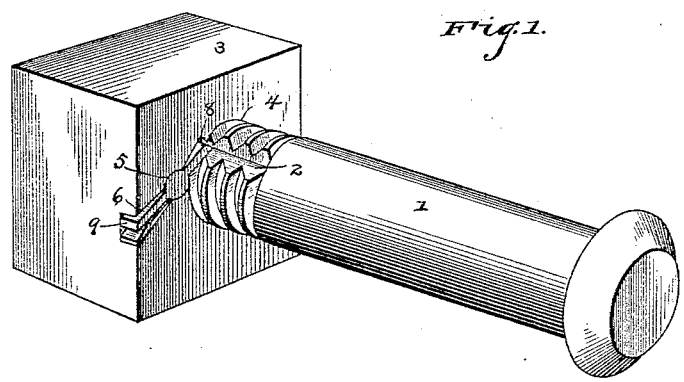
Figures 2, 3:
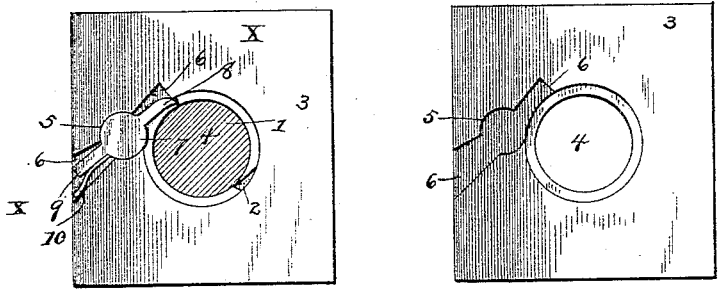
Figure 4:
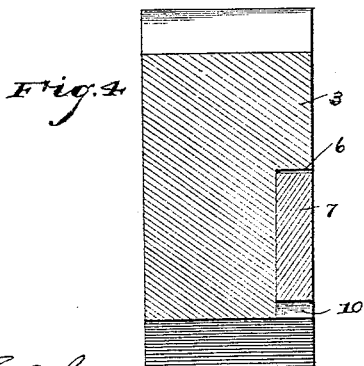
Figure 5:
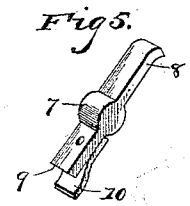

Referring to the drawings, Figure 1 is a perspective of a bolt and nut, the latter constructed in accordance with my invention. Fig. 2 is an inner face view or elevation of the nut. Fig. 3 is a similar view, the locking device removed. Fig. 4 is a section of the nut through the locking device. Fig. 5 is a detail in perspective of the locking device.

Like numerals of reference indicate like parts in all the figures of the drawings.

1 designates a bolt threaded, as usual, for a portion of its length and provided with one or a series of longitudinal grooves 2. These grooves are preferably slightly deeper than the thread of the bolt, and each has one abrupt edge and an inclined edge, or, in other words, are of an acute angle when viewed in cross-section. Where small bolts are used, one groove is usually sufficient; but where the bolts are large two, three, or even more grooves may be formed.

3 designates the nut, which is provided with the usual threaded opening 4 for the reception of the threaded end of the bolt. The inner face of the nut is provided with a recess tangentially disposed with relation to the opening 4, and this recess comprises a central cylindrical portion or bearing 5, at diametrically-opposite sides of which are located straight branches or continuations 6, the inner one of which communicates with the opening 4 and the outer one of which extends to the outer edge or face of the nut, and each is slightly flared toward its outer extremity.

The fastening device, or "pawl," as it might be more properly termed, consists of a cylindrical central portion 7, at diametrically-opposite sides of which extend the pawl-engaging end 8 and the tail end 9. The pawl end 8 is beveled to engage with the grooves 2 of the bolt and is normally pressed into such engagement by means of a flat spring 10, riveted at 11 to the tail end 9, adjacent to the cylindrical bearing portion 7 of the lock.

The general shape of the pawl is such as to coincide with that of the recess formed in the inner face of the nut, the bearing portion 5 of the recess accommodating the cylindrical bearing portion 7 of the pawl or lock, and in said bearing-recess the pawl, it will be seen, is capable of oscillating in the same manner as if it were pivoted, while the branch 6 of the recess accommodates for movement the pawl end 8 of the pawl or lock, and the outer branch 6 of the recess accommodates the tail end 9 of the pawl or lock, together with the spring 10, which bears against the wall of the recess, and hence normally presses the operative end of the pawl into the path of the grooves of the bolt.

This being the construction, the obvious operation is as follows: The nut is run upon the bolt in the usual manner, the pawl readily riding over the threads and the grooves 2 of the bolt and dropping into each of said grooves as they are successively presented to the pawl. It will be seen that while the pawl rides readily over the grooves when the nut is rotated to the right or in the direction in which it moves when applied, yet any attempt to remove the nut or rotate it to the left will be defeated by the inner or operative end of the pawl engaging with the undercut wall of the groove 2, which, as before stated, when viewed in cross-section, is acute. Thus it will be seen that the nut will automatically lock upon the bolt at any point and be prevented from retrograding. In order to remove the nut, it is simply necessary to insert a wedge-pointed tool between the tail end of the nut and that wall of the recess opposite the one against which the spring bears, and such will oscillate the pawl against the spring, so as to withdraw the opposite or inner end of the pawl from engagement with the groove, and while the pawl is held in this position the nut is free to rotate to the left.

From the foregoing description, in connection with the accompanying drawings, it will be seen that I have provided a means for locking nuts upon bolts at any point thereof and automatically, which means are inherent in the nut and yet do not change the outward appearance of the same, and that I avoid the use of pivoting-pins or other labor that would be thus necessary in order to assemble the parts, but simply seat the lock in a recess so formed as to combine with it.

Having described my invention, what I claim is—

The combination, with the bolt having the longitudinal groove formed in its threaded end, of the nut having the bolt-receiving opening and at its inner face provided with the recess tangentially disposed with relation to the opening and extending from the opening to the outer wall or edge of the nut, said recess consisting of the central cylindrical portion 5 and the diametrically-opposite branches 6, flared toward their outer ends, the locking-pawl consisting of the cylindrical central bearing portion 7, located for oscillation in the cylindrical bearing portion 5 of the recess, and the diametrically-opposite pawl and tail ends 8 and 9, the former located in the inner recess 6 and the latter in the outer portion of the recess 6, and the flat spring 10, riveted at 11 to one side of the tail 9 and bearing against the wall of the outer recess 6 and serving to inwardly press the inner or pawl end of the locking-pawl into engagement with the groove of the bolt, substantially as specified.

In testimony that I claim the foregoing as my own I have hereto affixed my signature in the presence of two witnesses.

SAMUEL C. HICKERSON.

Witnesses:
GEORGE BALDING,
THOMAS HUMPHREY.